United States Patent
Guday et al.

(10) Patent No.: US 9,092,783 B2
(45) Date of Patent: Jul. 28, 2015

(54) VIRAL DISTRIBUTION AND TRACKING OF ELECTRONIC COUPONS

(75) Inventors: Shai Guday, Redmond, WA (US); Miller Thomas Abel, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 12/580,731

(22) Filed: Oct. 16, 2009

(65) Prior Publication Data

US 2011/0093318 A1   Apr. 21, 2011

(51) Int. Cl.
*G06Q 30/00* (2012.01)
*G06Q 30/02* (2012.01)

(52) U.S. Cl.
CPC ............ *G06Q 30/00* (2013.01); *G06Q 30/0207* (2013.01); *G06Q 30/0211* (2013.01); *G06Q 30/0235* (2013.01); *G06Q 30/0236* (2013.01)

(58) Field of Classification Search
CPC .................................................. G06Q 30/0207
See application file for complete search history.

(56) References Cited

U.S. PATENT DOCUMENTS

| | | | |
|---|---|---|---|
| 2002/0010627 A1 | 1/2002 | Lerat | |
| 2005/0131761 A1* | 6/2005 | Trika et al. | 705/14 |
| 2005/0135304 A1 | 6/2005 | Wentink et al. | |
| 2005/0154996 A1* | 7/2005 | Othmer | 715/774 |
| 2005/0188062 A1* | 8/2005 | Li et al. | 709/220 |
| 2005/0210387 A1* | 9/2005 | Alagappan et al. | 715/700 |
| 2006/0218577 A1 | 9/2006 | Goodman et al. | |
| 2007/0241189 A1* | 10/2007 | Slavin et al. | 235/383 |
| 2008/0040219 A1 | 2/2008 | Kim et al. | |
| 2008/0052169 A1* | 2/2008 | O'Shea et al. | 705/14 |
| 2008/0133366 A1 | 6/2008 | Evans et al. | |
| 2008/0183571 A1* | 7/2008 | Aaron | 705/14 |
| 2008/0221984 A1* | 9/2008 | Abhyanker | 705/14 |
| 2008/0227385 A1 | 9/2008 | Bappu et al. | |
| 2008/0228777 A1* | 9/2008 | Sawant | 707/10 |
| 2008/0242317 A1* | 10/2008 | Abhyanker | 455/456.3 |
| 2008/0312962 A1* | 12/2008 | Kirkwood | 705/2 |
| 2009/0061884 A1 | 3/2009 | Rajan et al. | |
| 2009/0076911 A1 | 3/2009 | Vo et al. | |
| 2009/0076912 A1* | 3/2009 | Rajan et al. | 705/14 |
| 2009/0125389 A1* | 5/2009 | Dunko et al. | 705/14 |

(Continued)

FOREIGN PATENT DOCUMENTS

KR   1020090057695 A   6/2009

OTHER PUBLICATIONS

"Viral Marketing", retrieved at <<http://en.wikipedia.org/wiki/Viral_marketing>>, Jul. 22, 2009, pp. 4.

(Continued)

*Primary Examiner* — Matthew T Sittner
(74) *Attorney, Agent, or Firm* — Bryan Webster; Kate Drakos; Micky Minhas (57) ABSTRACT

Distributing and tracking electronic coupons based on proximity. Upon detecting recipients proximate to a computing device, one or more electronic coupons are selected and transmitted to the detected recipients. The transmittal occurs via a wireless connection in some embodiments. Coupon properties associated with the transmitted coupons are adjusted (e.g., values decreased, expiration conditions modified, location of transmittal, etc.). Distribution data for the transmitted coupons is stored to maintain a distribution history.

20 Claims, 4 Drawing Sheets

(56) References Cited

U.S. PATENT DOCUMENTS

| | | | |
|---|---|---|---|
| 2009/0131080 A1* | 5/2009 | Nadler et al. | 455/456.3 |
| 2009/0153342 A1* | 6/2009 | Thorn | 340/669 |
| 2009/0156190 A1 | 6/2009 | Fisher | |
| 2009/0234945 A1* | 9/2009 | Chande et al. | 709/224 |
| 2009/0288012 A1* | 11/2009 | Hertel et al. | 715/738 |
| 2009/0299856 A1* | 12/2009 | Caunter | 705/14.64 |
| 2010/0063889 A1* | 3/2010 | Proctor et al. | 705/21 |
| 2010/0125490 A1* | 5/2010 | Kiciman et al. | 705/14.1 |
| 2010/0211431 A1* | 8/2010 | Lutnick et al. | 705/10 |
| 2010/0222084 A1* | 9/2010 | Butterfield et al. | 455/458 |
| 2011/0070837 A1* | 3/2011 | Griffin et al. | 455/41.3 |
| 2011/0076943 A1* | 3/2011 | Chang | 455/41.1 |
| 2011/0145049 A1* | 6/2011 | Hertel et al. | 705/14.23 |

OTHER PUBLICATIONS

Morales, Mònika Jiménez, "Viral Advertising: Communication through Infections", retrieved at <<http://www.hipertext.net/english/pag1029.htm>>, May 6, 2008, pp. 5.

Montaldo, Donna L, "The Future of Coupons—New Coupon Distribution Methods", retrieved at <<http://couponing.about.com/od/storesofferingdiscounts/p/futureofcoupons.htm>>, Jul. 22, 2009, pp. 2.

"Mobile Coupon Distribution", retrieved at <<http://www.astroleap.com/service.htm>>, Jul. 22, 2009, p. 1.

"AVT Wireless Technology Replaces Printed Coupons", retrieved at <<http://www.reuters.com/article/pressRelease/idUS134871+06-May-2009+PRN20090506>>, May 6, 2009, pp. 2.

"Internet Coupons", retrieved at <<http://www.collabrys.com/pdf/COLL-Internet_Coupons.pdf>>, 2008, pp. 2.

"Mobile Coupons by MobileStorm", retrieved at <<http://www.mobilestorm.com/mobile-coupons/>>, Jul. 23, 2009, pp. 3.

"International Search Report", Mailed Date: May 24, 2011, Application No. PCT/US2010/052124, Filed Date: Oct. 11, 2010, pp. 9.

"First Office Action in China Patent Application No. 201080046268.9", Dated: Oct. 9, 2012, pp. 7.

"China Office Action", Mailed Date: Jul. 23, 2013, Application No. 201080046268.9, Filed Date: Oct. 11, 2010, pp. 8.

"China Second Office Action", Mailed Date: Mar. 11, 2013, Application No. 201080046268.9, Filed Date: Oct. 11, 2010, pp. 7.

* cited by examiner

VIRAL DISTRIBUTION AND TRACKING OF ELECTRONIC COUPONS

BACKGROUND

Print coupons are commonly available and are typically distributed by merchants to entice users to try products and services. Electronic coupons are also made available on, for example, web sites or by distribution to selected electronic devices such as mobile telephones. In such an example, the users of the mobile telephones are able to view the electronic coupons and redeem the coupons either at a physical store or online via the Internet. The existing systems have limited information (e.g., market analysis and demographics) from which the users are identified to receive the electronic coupons. In addition, many existing systems are able to identify only the initial recipient of the electronic coupons, and are otherwise unable to track subsequent distribution of the electronic coupons by the initial recipient.

SUMMARY

Embodiments of the disclosure enable the viral distribution of electronic coupons. A computing device of a user identifies one or more recipients proximate to the user. At least one electronic coupon having one or more coupon properties is selected. The selected coupon is provided to the identified recipients. At least one of the coupon properties of the selected coupon is adjusted based on the providing of the selected coupon to the identified recipients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable, at least, the viral distribution and tracking of electronic coupons 208. The electronic coupons 208 may also be referred to as digital coupons or mobile coupons. In some embodiments, a mobile computing device 202 selectively shares the electronic coupons 208 with other computing devices proximate to the mobile computing device 202. The value of the electronic coupons 208, or other coupon properties 210, may be adjusted responsive to the sharing of the electronic coupons 208. A distribution history is maintained to enable the tracking and analysis of the viral distribution. The electronic coupons 208 include electronic representations of any promotional program, campaign, or offer such as for discounted goods and services and may include or constitute one or more advertisements.

Referring again to FIG. 1, an exemplary block diagram illustrates a computing device 102, coupon service 106, and recipient computing devices 104 communicating via a network 108. In some embodiments, the computing device 102 includes a mobile telephone. In other embodiments, the computing device 102 includes a plurality of computing devices programmed to implement the functionality described herein. For example, the computing device 102 may represent one or more wireless beacons corresponding to an outside advertising system or point-of-sale infrastructure. In some embodiments, at least a portion of the functionality of the various elements in FIG. 1 is performed by other elements in FIG. 1, or an entity (e.g., processor, web service, server, application program, computing device, etc.) not shown in FIG. 1.

The coupon service 106 includes, for example, coupon service #1 through coupon service #M. In some embodiments, the coupon service 106 is a web service operating to provide the electronic coupons 208 to the computing device 102 and/or the recipient computing devices 104. The coupon service 106 may include a single computing device, or a plurality of computing devices such as in a cloud computing environment. Exemplary networks 108 include wired and/or wireless networks, and may represent local area networks or global networks such as the Internet. The recipient computing devices 104 include, for example, recipient computing device #1 through recipient computing device #N. The recipient computing devices 104 may each include a single computing device, or a plurality of computing devices such as in a cloud computing environment.

Figure 1:
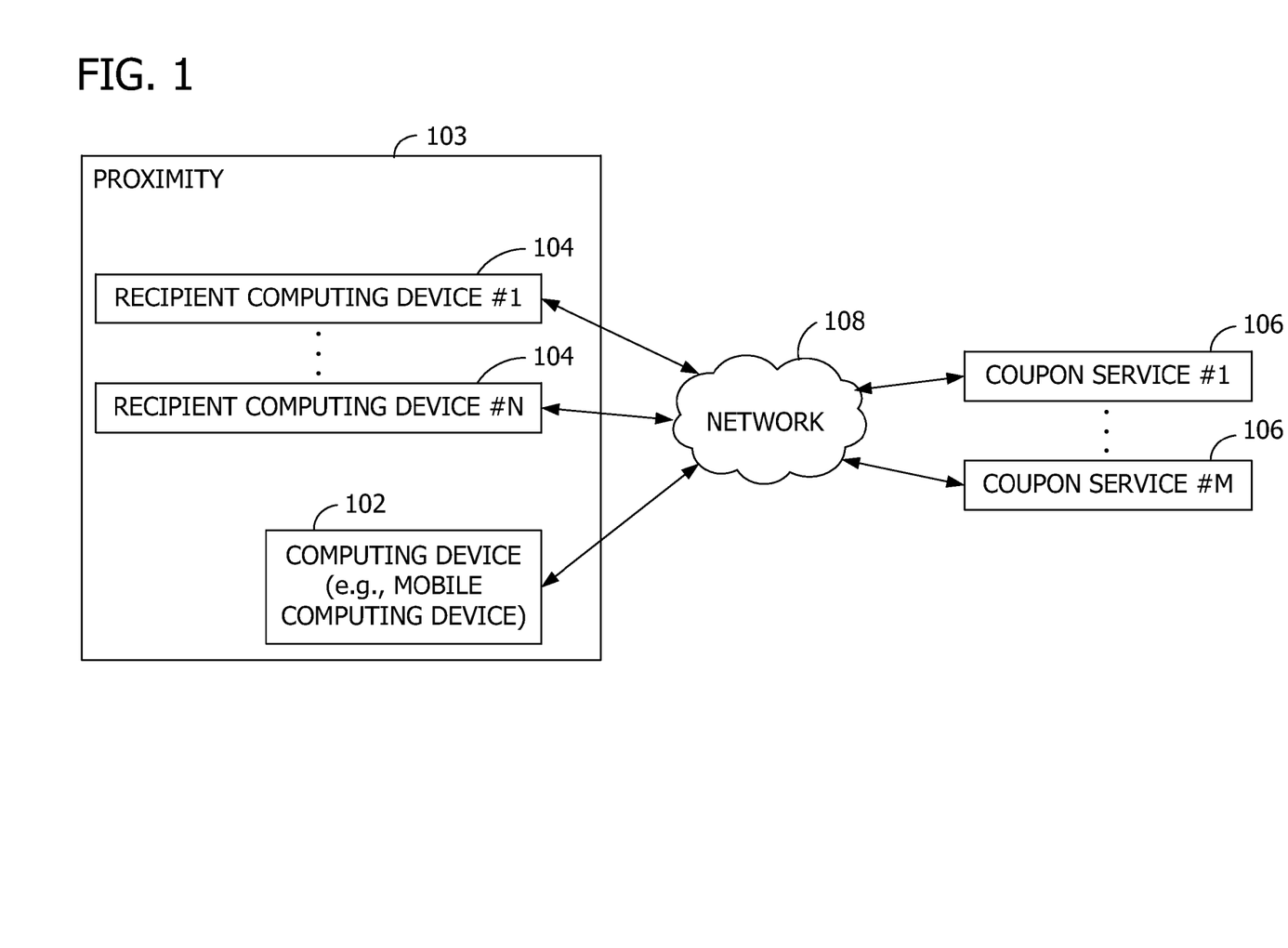
FIG. 1 is an exemplary block diagram illustrating a computing device, coupon service, and recipient computing device communicating via a network.

In the example of FIG. 1, the computing device 102 and the recipient computing devices 104 are within a pre-defined proximity 103. The size or extent of the proximity 103 is defined by the corresponding communication technology employed by the computing device 102. For example, BLUETOOTH brand wireless communication services typically have an effective range of 10 meters, while radio frequency identification (RFID) devices may have a read range of up to 100 meters. While the proximity 103 in FIG. 1 is illustrated as a rectangle for clarity, the shape of the actual proximity varies based at least on the communication technology and the environment in which the computing device 102 is located.

The electronic coupons 208 are transmitted to the recipient computing devices 104 in various ways in accordance with embodiments of the disclosure. In one example, the computing device 102 transmits one or more of the electronic coupons 208 to the recipient computing devices 104 while the recipient computing devices 104 are within the proximity 103 of the computing device 102 (e.g., see FIG. 2). In another example, the computing device 102 identifies the proximate recipient computing devices 104 to the coupon service 106, and the coupon service 106 transmits one or more of the electronic coupons 208 to the recipient computing devices 104 (e.g., see FIG. 4). Further, in some examples, actual coupon content (e.g., coupon properties 210 or other identifying and descriptive information) is transferred to the recipient computing devices 104. In other examples, representative data transfers occur via a third party entity. For example, a uniform resource identifier (URL) may be transferred to the recipient computing devices 104.

Figure 2:
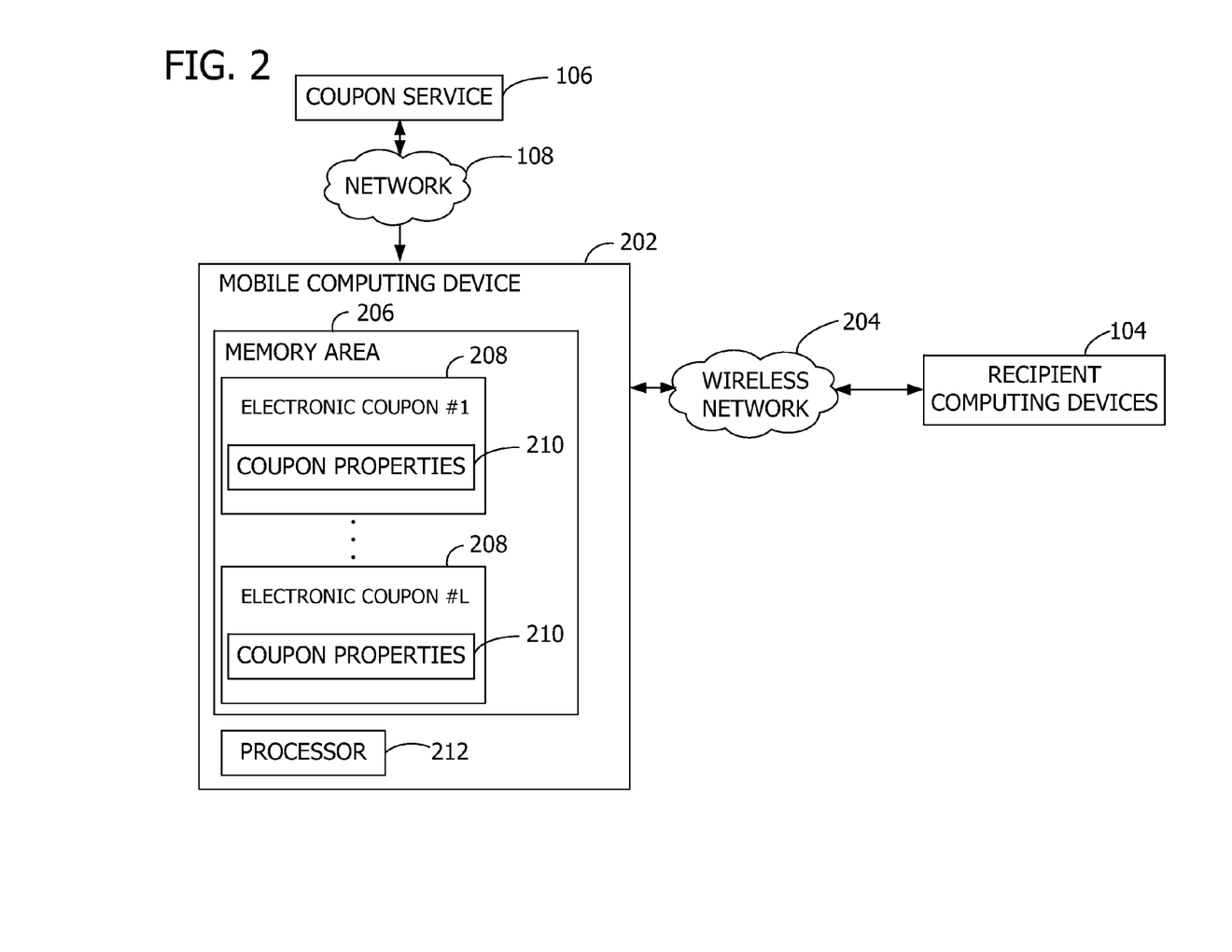
FIG. 2 is an exemplary block diagram illustrating a mobile computing device providing electronic coupons to recipient computing devices via a wireless network.

Referring next to FIG. 2, an exemplary block diagram illustrates the mobile computing device 202 providing electronic coupons 208 to recipient computing devices 104 via a wireless network 204. In the example of FIG. 2, the electronic coupons 208 are stored in a memory area 206 associated with the mobile computing device 202. In other embodiments (e.g., see FIG. 4), the electronic coupons 208 are stored elsewhere (e.g., accessible from a web service). The portion of the memory area 206 storing the electronic coupons 208 is referred to in some embodiments as an electronic coupon cache or electronic coupon wallet.

In the example of FIG. 2, the recipient computing devices 104 are within the proximity 103 of the mobile computing device 202. The mobile computing device 202 is connected to or in communication with the recipient computing devices 104 via the wireless network 204. The mobile computing device 202 is enabled with technology such as BLUETOOTH brand wireless communication services (secured or unsecured), radio frequency identification (RFID), wireless fidelity (Wi-Fi) such as peer-to-peer Wi-Fi, ZIGBEE brand wireless communication services, near field communication (NFC), and other technologies that enable short-range or long-range wireless communication. Aspects of the disclosure further contemplate thermal or ultrasound communication techniques where each of the recipient computing devices 104 has a signature (e.g., a thermal signature or an acoustic signature) that distinguishes each of the recipient computing devices 104 from each other. The mobile computing device 202 includes any portable computing device such as a mobile telephone, a laptop, a netbook, a gaming device, or a portable media player.

Alternative modes of distribution are contemplated. For example, the recipient computing devices 104 include a camera that captures an image of at lease one of the electronic coupons 208 displayed on the mobile computing device 202. The capturing of the electronic coupon image constitutes distribution of the electronic coupon 208 from the mobile computing device 202 to the recipient computing devices 104.

The mobile computing device 202 is connected to or in communication with the coupon service 106 via the network 108. In some embodiments, the coupon service 106 is accessible to the mobile computing device 202 via the Internet. In other embodiments, the coupon service 106 is within the proximity 103 of the mobile computing device 202.

The mobile computing device 202 includes at least the memory area 206 and a processor 212. The memory area 206, or other computer-readable media, stores one or more of the electronic coupons 208 such as electronic coupon #1 through electronic coupon #L. The electronic coupons 208 are delivered to the mobile computing device 202 from the coupon service 106 or retrieved by the mobile computing device 202 from the coupon service 106. Each of the electronic coupons 208 has one or more coupon properties 210 associated therewith. The coupon properties 210 include, for example, a coupon identifier, a value, an expiration condition (e.g., a date or a redemption quantity limit), a location of receipt (e.g., a location where the electronic coupon 208 was received), a merchant name, and any other data representing coupon content. Aspects of the disclosure contemplate a multipart coupon identifier that includes a merchant or vendor identifier along with a promotional campaign identifier. In some embodiments, the coupon properties 210 further include distribution data such as a distribution history indicating dates, times, and locations of distribution of the electronic coupons 208. The coupon identifier may also be a machine-readable identifier In general, the memory area 206 is associated with mobile computing device 202. For example, in FIG. 2, the memory area 206 is within the mobile computing device 202. However, the memory area 206 includes any memory area internal to, external to, or accessible by mobile computing device 202. Further, the memory area 206 or any of the data stored thereon may be associated with any server or other computer, local or remote from the mobile computing device 202 (e.g., accessible via a network).

The processor 212 includes any quantity of processing units, and is programmed to execute computer-executable instructions for implementing aspects of the disclosure. The instructions may be performed by the processor 212 or by multiple processors executing within the mobile computing device 202, or performed by a processor external to the mobile computing device 202 (e.g., by a cloud service). In some embodiments, the processor 212 is programmed to execute instructions such as those illustrated in the figures (e.g., FIG. 3).

The elements of FIG. 2 operate to enable the viral distribution of the electronic coupons 208 from the mobile computing device 202 to the recipient computing devices 104. The operation of the elements is next described with reference to FIG. 3.

Figure 3:
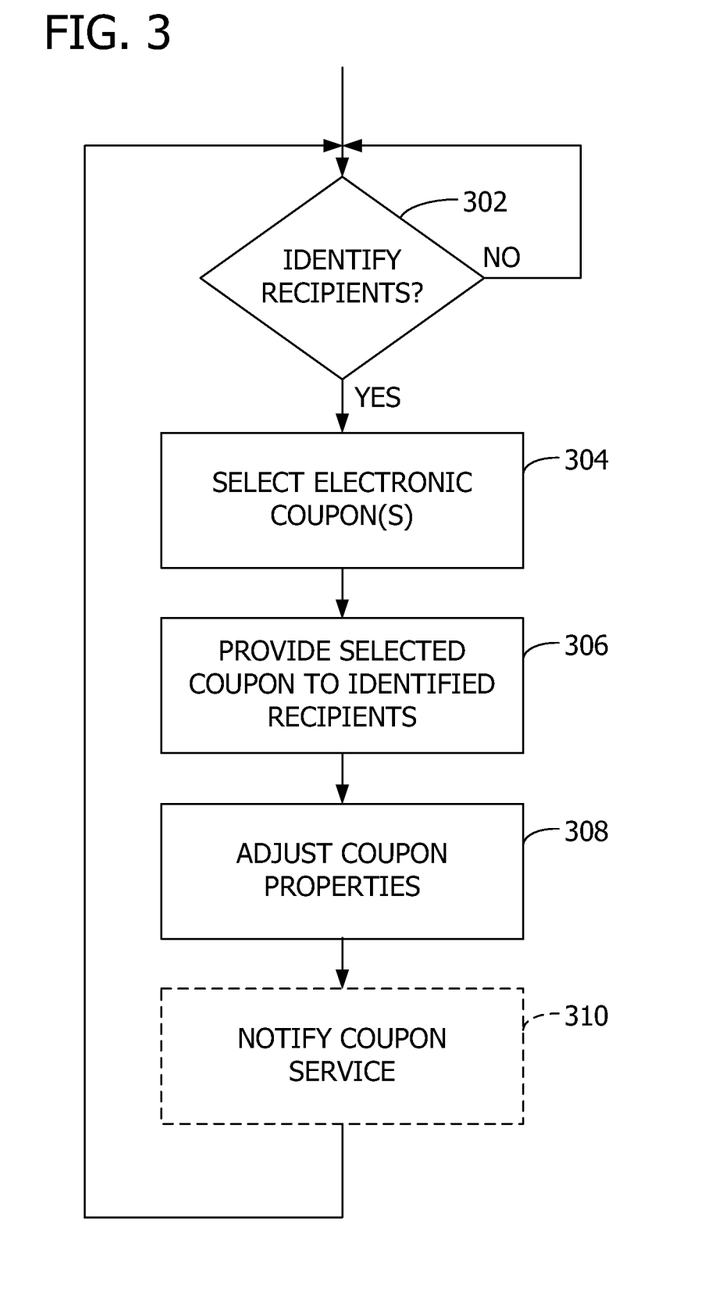
FIG. 3 is an exemplary flow chart illustrating operation of a computing device for the viral distribution and modification of electronic coupons to recipients proximate to a computing device.

Referring next to FIG. 3, an exemplary flow chart illustrates operation of the computing device 102 to distribute and modify electronic coupons 208 to recipients proximate to a user. The computing device 102 of the user attempts to identify recipients at 302. For example, the computing device 102 may detect recipients proximate to the user. Alternatively or in addition, the computing device 102 identifies recipients via a social networking web site (e.g., identify friends of the user). One or more of the electronic coupons 208 are selected at 304. For example, the computing device 102 may continually or periodically poll or search for proximate recipients. The computing device 102 may also search for recipients responsive to a request from the user of the computing device 102. The selected electronic coupons 208 are associated with, or otherwise available to, the computing device 102. In some embodiments, the electronic coupons 208 are selected based on the user (e.g., user preferences, profile, past purchase history, or online behavior) of the computing device 102, the detected recipients (e.g., user preferences, profile, past purchase history, or online behavior), a location of the proximity 103, a date/time, or other means.

The selected electronic coupons 208 are provided to the identified recipients at 306. For example, the selected electronic coupons 208 are provided by the computing device 102 to the recipients (e.g., via the wireless network 204) while the recipients are proximate to the computing device 102. Exemplary technology for transmitting the selected electronic coupons 208 to the recipients includes message push technology such as Internet Protocol (IP), hypertext transfer protocol (HTTP), and short message system (SMS) as well as the 802.11 family of standards. In another example (e.g., see FIG. 4), the computing device 102 or user notifies an entity (e.g., the coupon service 106) of the identified recipients and the entity provides the selected electronic coupons 208 to the recipients. The entity in this example is separate, remote, or otherwise distinct from the computing device 102.

In some embodiments, the selected electronic coupons 208 are provided to the recipients via non-proximity-based means in addition to, or alternatively from, proximity-based means. For example, the selected electronic coupons 208 are transmitted to the recipients via electronic mail messages or text messages. Such embodiments enable the tracing and identification of effective distribution paths. In examples in which the recipients were identified via a social networking service, aspects of the disclosure enable analysis of the effectiveness of the social network based on the distribution paths.

Responsive to the transmission of the selected electronic coupons 208 to the recipients, the coupon properties 210 of one or more of the provided electronic coupons 208 are adjusted at 308. The coupon properties 210 may be adjusted based on one or more of a plurality of factors such as the computing device 102, the recipients, the proximity 103, a geographic location of the computing device 102 and/or the recipients, the selected electronic coupons 208, a value of each of the selected electronic coupons 208, an expiration condition associated with each of the selected electronic coupons 208, and a date/time. For example, adjusting the coupon properties 210 includes decreasing a value associated with each of the selected electronic coupons 208, modifying an expiration condition associated with the selected electronic coupons 208, or updating distribution data (e.g., a distribution history or trail) stored as part of the coupon properties 210. In an example in which the value decreases below a pre-defined threshold (e.g., zero), the electronic coupon 208 is removed from the computing device 102 (e.g., deleted from the memory area 206 of the mobile computing device 202) or otherwise invalidated. The logic for adjusting the coupon properties 210 may be stored as part of the coupon properties 210, or stored with the coupon service 106 and accessed by the computing device 102.

In some embodiments, the values of the electronic coupons 208 diminish dynamically as the distribution trail extends. In other embodiments, the expiration conditions are provisioned out-of-band (e.g., outside of the communication between the computing device 102 and the recipients) and managed by routines executing on the computing device 102 or by the coupon service 106.

The adjusted coupon properties 210 are stored in, for example, the memory area 206 of the mobile computing device 202 or a storage area associated with the coupon service 106.

In some embodiments, the computing device 102 notifies the coupon service 106 at 310 of the transmission of the selected electronic coupons 208 and/or the adjustment of the coupon properties 210 (or data for any of the coupon properties 210). For example, the computing device 102 identifies one or more of the following to the coupon service 106: the computing device 102, the recipients, the proximity 103, a geographic location of the computing device 102 and/or the recipient, the selected electronic coupons 208 and associated coupon properties 210, the adjusted coupon properties 210, and a date/time. Similarly, the computing device 102 may also notify the coupon service 106 if the user of the computing device 102 redeems one of the electronic coupons 208 associated with the user or computing device 102. In other embodiments, the coupon service 106 monitors the distribution of the electronic coupons 208 between the computing device 102 and the recipients.

At least one of the recipients (or subsequent downstream recipients) redeems the transmitted electronic coupon 208. In some embodiments, the redeeming recipient or redeeming merchant contacts the coupon service 106 to validate the transmitted electronic coupon 208 before redemption. In such embodiments, the coupon service 106 has maintained the values of each of the transmitted electronic coupons 208, and is thus able to validate and authenticate the electronic coupon 208 for redemption.

The computing device 102 of the user may subsequently receive a notification from at least one of the recipients of the redemption of the transmitted electronic coupon 208. Alternatively, the computing device 102 receives the notification from the redeeming merchant or vendor. The notification may take the form of an electronic receipt or other electronic record. In some embodiments, the notification includes additional coupons for the computing device 102 of the user or an award or recognition of some form for the computing device 102 and user. In response, the computing device 102 may update any of the coupon properties 210 of the redeemed coupon (e.g., update a distribution history to indicate redemption) or reward the user of the computing device 102 for previously transmitting the now-redeemed electronic coupon 208. In further embodiments, each user involved in distributing the electronic coupon 208 that is ultimately redeemed receives the reward or recognition.

In other embodiments (e.g., see FIG. 4), the coupon service 106 receives the notification from the recipient of the redemption of the transmitted electronic coupon 208, updates the appropriate coupon properties 210 accordingly, and optionally rewards the user of the computing device 102 that previously transmitted the now-redeemed electronic coupon 208.

Rewarding the user includes, for example, both monetary and non-monetary awards. Example monetary awards include crediting an account of the user, sending a check to the user, or issuing a stored-value gift card to the user. Example non-monetary awards include providing additional electronic coupons 208 to the user, increasing values of electronic coupons 208 already associated with the user, or otherwise reward and recognize the user.

Some embodiments of the disclosure enforce an opt-in policy. For example, the recipients may opt-in to receive the electronic coupons 208 from devices such as the computing device 102 or the coupon service 106, opt-out from receiving the electronic coupons 208, or selectively opt-in to particular electronic coupons 208 (e.g., based on the merchant, value, location of transmission, etc.). In some embodiments, the policy settings include privacy settings and/or subject matter filters. The policy settings may be broadcast from each recipient, or stored in a storage area associated with, for example, the coupon service 106. The subject matter filters identify preferences or interests of the recipient that aid in determining whether a particular electronic coupon 208 is relevant or of interest to the recipient. In some embodiments, the subject matters filters are context-based such that particular subject matter may be relevant in certain contexts yet not other contexts. For example, the recipient may wish to receive electronic coupons 208 for grocery items while the recipient is within a grocery store, but not receive such electronic coupons 208 when in any other location. In some embodiments, there are separate policy settings for acceptance, redemption, and sharing of the electronic coupons 208. The computing device 102 (or coupon service 106) checks the policy settings prior to transmitting the selected electronic coupons 208 to the detected recipients.

The operations illustrated in FIG. 3 may be implemented as software instructions encoded on a computer-readable medium, in hardware programmed or designed to perform the operations, or both. For example, one or more computer-readable media associated with the computing device 102 may store computer-executable components or modules for performing the operations. Exemplary components include a first component that, when executed by a processor associated with the computing device 102, detects the recipients proximate to the user. A second component, when executed by a processor associated with the computing device 102, selects the electronic coupons 208. A third component, when executed by a processor associated with the computing device 102, provides the electronic coupons 208 selected by the second component to the recipients determined to be proximate by the first component. A fourth component, when executed by a processor associated with the computing device 102, adjusts the coupon properties 210 of one or more of the transmitted electronic coupons 208.

In some embodiments, the operations illustrated in FIG. 3 are performed by the computing device 102. In other embodiments, one or more of the operations illustrated in FIG. 3 are performed by another computing device (e.g., as a web service) as next described with reference to FIG. 4.

Figure 4:
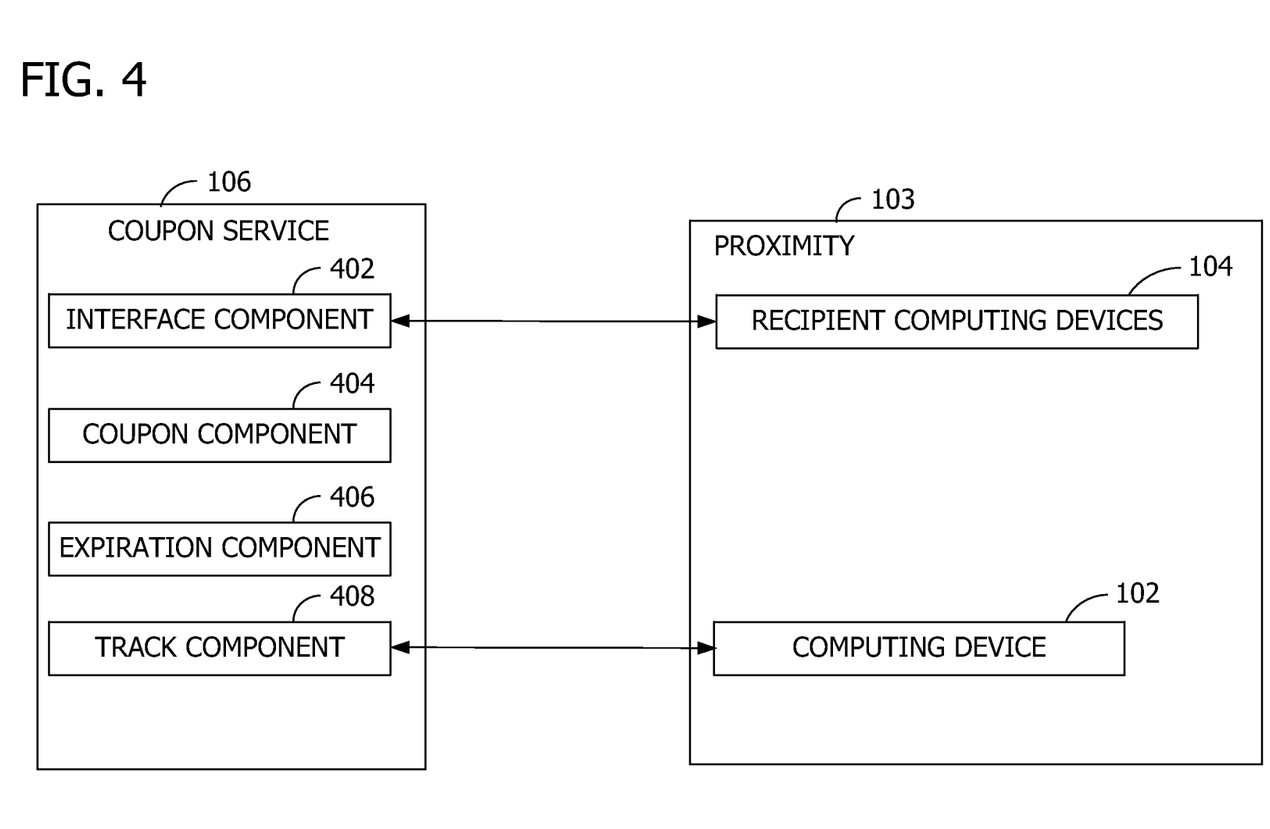
FIG. 4 is an exemplary block diagram illustrating a coupon service providing electronic coupons to recipient computing devices identified by a computing device.

Referring next to FIG. 4, an exemplary block diagram illustrates the coupon service 106 providing the electronic coupons 208 to the recipient computing devices 104 identified by the computing device 102. The recipient computing devices 104 are within the proximity 103 of the computing device 102. The recipient computing devices 104 and the computing device 102 communicate with the coupon service 106 (e.g., via a network such as the Internet).

In the example of FIG. 4, the computing device 102 detects the recipient computing devices 104 within the proximity 103 and notifies the coupon service 106. The coupon service 106 performs the selection and delivery of the electronic coupons 208 to the detected recipient computing devices 104. The operation of the coupon service 106 is next described with reference to computer-executable components for execution by the coupon service 106.

One or more computer-readable media (not shown) accessible to the coupon service 106 store the computer-executable components. Exemplary components include an interface component 402, a coupon component 404, an expiration component 406, and a track component 408. The interface component 402, when executed by a processor associated with the coupon service 106, causes the processor to receive identification from the computing device 102 of one or more of the recipient computing devices 104 proximate to the computing device 102. The coupon component 404, when executed by a processor associated with the coupon service 106, causes the processor to select at least one of the electronic coupons 208. The interface component 402 distributes the electronic coupon 208 selected by the coupon component 404 to the identified recipients. The expiration component 406, when executed by a processor associated with the coupon service 106, causes the processor to adjust at least one of the coupon properties 210 of the selected coupon. The track component 408, when executed by a processor associated with the coupon service 106, causes the processor to store distribution data associated with the selected coupon. The distribution data includes, for example, data identifying the computing device 102 (e.g., an identifier to distinguish the computing device 102 from other computing devices), a login or electronic mail address of the user of the computing device 102, the recipient computing devices 104, logins or electronic mail addresses of the users of the recipient computing devices 104, the selected electronic coupon 208, the coupon properties 210 associated with the selected electronic coupon 208, and a geographic location of the computing device 102 and/or recipient at the time of the present distribution and/or previous distributions. In some embodiments, the distribution data represents a distribution history. In other embodiments, the distribution history may be generated from the distribution data for a particular electronic coupon 208, computing device 102, or recipient computing device 104. The distribution history may be used by merchants or the coupon service 106 to identify distribution patterns and identify or evaluate markets for goods and services, for advertising, and for other market analysis purposes.

Further Examples

Various implementations of the disclosure are contemplated. For example, the electronic coupons 208 may be encrypted such that only authorized computing devices are able to access the electronic coupons 208 and associated coupon properties 210. In such examples, while the electronic coupons 208 may be encrypted, the transmission of the electronic coupons 208 may occur to entice unauthorized recipients to seek authorization to view the coupon properties 210 (e.g., subscribe or sign-up with the coupon service 106).

In another example, the coupon properties 210 include redemption suggestions created dynamically based on the accumulated distribution data. Exemplary redemption suggestions include "Other shoppers redeemed this coupon at the coffee shop on Main Street." The redemption suggestions may also be based on previous distribution locations of the electronic coupon 208, shopping behaviors of users of the recipient computing devices 104, campaign life cycle, and vendor/merchant preferences.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks 310 or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for viral distribution and tracking of the electronic coupons 208 from the mobile computing device 202 to the recipient computing device 104, and exemplary means for adjusting the coupon properties 210 based on the transmittal of the selected coupon from the mobile computing device 202 to the recipient computing device 104.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for automated viral distribution of electronic coupons between users, said system comprising:
   a memory area associated with a mobile computing device of a first user, said memory area storing a plurality of electronic coupons, each of said electronic coupons having one or more coupon properties associated therewith; and
   a processor associated with the mobile computing device, said processor being programmed to:
      detect a recipient computing device of a second user proximate to the mobile computing device of the first user, wherein neither the first user nor the second user is a merchant or a vendor;
      in response to detecting the recipient computing device, automatically select at least one of the electronic coupons stored in the memory area, said selection being based on context-based subject matter filters associated with the detected recipient computing device, the context-based subject matter filters identifying interests of the second user associated with the detected recipient computing device;
      transmit the selected coupons to the detected recipient computing device while the detected recipient computing device is proximate to the mobile computing device; and
      adjust at least one of the coupon properties associated with the selected coupon stored in the memory area based at least on the transmittal of the selected coupon.

2. The system of claim 1, wherein the processor is programmed to select said at least one of the electronic coupons based on the first user of the mobile computing device, the second user associated with the detected recipient computing device, and a location of the proximity.

3. The system of claim 1, wherein at least one of a downstream recipient redeems one or more of the transmitted electronic coupons, wherein the processor is further programmed to notify a coupon service of the redemption of said one or more of the transmitted electronic coupons, and wherein each user involved in transmitting the redeemed electronic coupon receives a reward.

4. The system of claim 1, wherein the processor is programmed to adjust the at least one of the coupon properties by adjusting a value of the selected coupon to zero, and wherein the processor is further programmed to remove the selected coupon from the memory area.

5. The system of claim 1, wherein the coupon properties comprises one or more of the following: a value, a redemption quantity limit, an expiration date, and a distribution location.

6. The system of claim 1, wherein the processor is programmed to transmit the selected coupons to the recipient computing device if the recipient computing device has opted-in to receive the selected coupons.

7. The system of claim 1, further comprising means for viral distribution and tracking of the electronic coupons from the mobile computing device to the recipient computing device.

8. The system of claim 1, further comprising means for adjusting the coupon properties based on the transmittal of the selected coupon from the mobile computing device to the recipient computing device.

9. A method for automated sharing of electronic coupons between users, said method comprising:
   identifying, by a computing device, one or more recipients, wherein at least one of the identified recipients is proximate to a user, said computing device being associated with the user and said computing device being capable of distributing electronic coupons to the identified recipients, wherein neither the user nor the identified recipients is a merchant or a vendor;
   in response to identifying the one or more recipients, automatically selecting at least one electronic coupon associated with the computing device, said selected coupon having one or more coupon properties associated therewith, said selecting being based on context-based subject matter filters associated with the identified recipients, the context-based subject matter filters identifying interests of the identified recipients;
   providing the selected coupon to the identified recipients; and
   adjusting at least one of the coupon properties of the selected coupon associated with the computing device based at least on said providing the selected coupon.

10. The method of claim 9, wherein providing the selected coupon comprises providing the selected coupon to the identified recipients while the identified recipients are proximate to the user.

11. The method of claim 9, wherein providing the selected coupon comprises notifying a coupon service of the identified recipients, wherein the coupon service transmits the selected coupon to the identified recipients, the coupon service transmitting the selected coupon being distinct from the computing device that identified the one or more recipients.

12. The method of claim 9, further comprising receiving, by the computing device, a notification from at least one of the identified recipients, said notification indicating redemption of the selected coupon.

13. The method of claim 9, wherein adjusting at least one of the coupon properties comprises one or more of the following: decreasing a value associated with the selected coupon, and adjusting an expiration condition for the selected coupon.

14. The method of claim 12, further comprising rewarding the user of the computing device, in response to the notification, for providing the redeemed coupon.

15. The method of claim 9, further comprising notifying a coupon service of said providing and said adjusting.

16. One or more computer storage media storing computer-executable components for automated sharing of electronic coupons, said components comprising:
   an interface component that when executed by at least one processor causes the at least one processor to receive, from a mobile computing device of a user, identification of one or more recipient computing devices proximate to the mobile computing device, wherein neither the user nor the identified recipients is a merchant or a vendor;
   a coupon component that when executed by at least one processor causes the at least one processor to automatically select, in response to the identification of the one or more recipient computing devices, at least one electronic coupon, said selected coupon having one or more coupon properties associated therewith, wherein the interface component distributes the coupon selected by the coupon component to the identified recipients;
   an expiration component that when executed by at least one processor causes the at least one processor to adjust at least one of the coupon properties of the selected coupon responsive to said distributing; and
   a track component that when executed by at least one processor causes the at least one processor to store distribution data associated with the selected coupon, said distribution data identifying at least the mobile computing device, said one or more recipient computing devices, and the coupon properties associated with the electronic coupon, the coupon properties including redemption suggestions created dynamically based on the distribution data accumulated by the track component, the redemption suggestions being based on a previous distribution location of the electronic coupon.

17. The computer storage media of claim 16, wherein the track component further generates a distribution history for the selected coupon based on the stored distribution data, the distribution history indicating dates, times, and locations of distribution of the selected coupon.

18. The computer storage media of claim 16, wherein the coupon component selects the electronic coupon based on preferences of users associated with the recipient computing devices identified by the interface component.

19. The computer storage media of claim 18, wherein the preferences include privacy settings and subject matter filters.

20. The computer storage media of claim 16, wherein the coupon component selects the at least one electronic coupon by selecting at least one advertisement and wherein the redemption suggestions are based on one or more of the following: distribution locations of the electronic coupon, shopping behaviors of users of the recipient computing devices, campaign life cycle, and vendor/merchant preferences.

* * * * *